United States Patent [19]
Carlson, Jr.

[11] 3,872,714
[45] Mar. 25, 1975

[54] METHOD AND APPARATUS FOR TESTING A VALVE

[75] Inventor: William L. Carlson, Jr., St. Cloud, Minn.

[73] Assignee: General Signal Corporation, Rochester, N.Y.

[22] Filed: Jan. 29, 1974

[21] Appl. No.: 437,553

[52] U.S. Cl. .................................. 73/46, 73/37
[51] Int. Cl. ............................................ G01n 3/08
[58] Field of Search ........... 73/37, 40, 45.5, 46, 47, 73/49.7, 119 R; 137/312; 340/242

[56] References Cited
UNITED STATES PATENTS
3,653,254  4/1972  Simon.................................... 73/46

Primary Examiner—Richard C. Queisser
Assistant Examiner—John S. Appleman
Attorney, Agent, or Firm—Jeffrey S. Mednick

[57] ABSTRACT

A method and apparatus for testing valves includes a first liquid, whose boiling point is slightly higher than the ambient temperature of the surroundings on one side of the valve, and a second liquid on the other side of the valve. The pressure of the first liquid is increased to a predetermined amount whereby any leakage of the first liquid may be observed as bubbles in the second liquid.

17 Claims, 3 Drawing Figures

PATENTED MAR 25 1975  3,872,714

3,872,714

METHOD AND APPARATUS FOR TESTING A VALVE

BACKGROUND OF THE INVENTION

1. Field of Use

While the invention is subject to a wide range of applications, it is especially suited for testing leakage of valves, such as butterfly valves and will be particularly described in that connection.

2. Description of the Prior Art

It is customary in the valve industry to test valves for leakage before sale to assure quality and compliance to rated specifications. In the past, leakage tests have been performed either hydrostatically or pneumatically.

Hydrostatic tests, where the valve is tested with a liquid, such as hydraulic fluid, are generally considered to be safer than pneumatic tests. In hydrostatic test, a rupture in the valve results in a spray of liquid with an extremely rapid drop in pressure. With a pneumatic test, a leak often results in a minor explosion and shrapnel.

Even though pneumatic tests are more dangerous than hydrostatic tests, more testing in the valve industry has been done pneumatically. This is because pneumatic tests are more sensitive to leakage and therefore more accurate. Leakage is determined in a pneumatic test by observing bubbles of air as they pass the sealing member and enter a blanket of liquid.

It is an object of the present invention to provide a method and apparatus for testing valves that is at least as safe as hydrostatic tests and at least as accurate as pneumatic tests.

It is a further object of the present invention to provide an apparatus that is relatively inexpensive to manufacture.

It is a further object of the present invention to provide a method for testing valves that is relatively easy to carry out.

SUMMARY OF THE INVENTION

In accordance with the present invention, an apparatus and a method are disclosed for testing valves for leakage. A first liquid is provided on one side of the valve closure member and a second liquid is provided on the other side of the valve closure member. The first liquid has a boiling point that is slightly higher than the ambient temperature of the surroundings. The pressure of the first liquid is increased to a predetermined amount. If there is a leak in the valve, the first liquid undergoes a throttling process which thermodynamically is essentially a constant heat process. This results in vaporization of the first liquid as it leaks past the valve closure member and enters the second liquid on the other side of the valve closure member. Bubbles from the first liquid may then be observed in the second liquid to indicate that the valve is leaking.

For a better understanding of the present invention, together with other and further objects thereof, reference is made to the following description taken in connection with the accompanying drawings, while its scope will be pointed out in the appended claims.

DESCRIPTION OF THE PREFERRED EMBODIMENT

Figure 1:
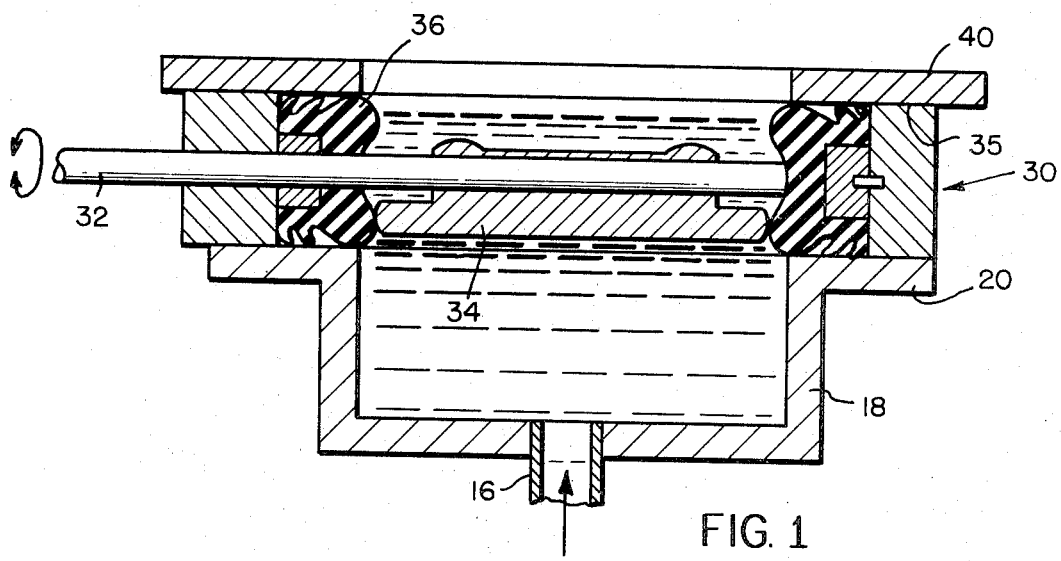
FIG. 1 is a schematic view illustrating a valve mounted for testing in accordance with the present invention.

Referring to FIG. 1, there is shown a schematic view of a valve 30 mounted on flange 20 of tank 18. As shown, valve 30 is a butterfly valve, but one skilled in the art will realize that the apparatus and method of the present invention are suitable for testing other types of valves. Valve 30 is shown having a valve stem 32 connected to a disc 34 (closure member). Rotation of valve stem 32 causes disc 34 to engage seat 36 and therefore close valve 30. Suitable clamps 40 hold valve 30 in position to be tested.

Figure 2:
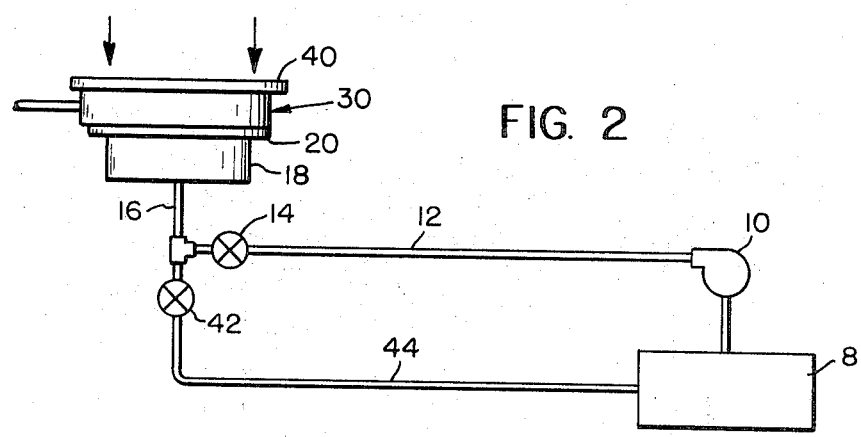
FIG. 2 is a schematic view illustrating a fluid circuit used in the present invention.

Referring to FIG. 2, the operation of the present invention will become clear. A first liquid is stored in a reservoir 8. Pump 10 such as a rotary vane, high pressure pump, pumps the first liquid through conduit 12. When valve 14 is open and valve 42 is closed, the first liquid flows through conduit 16 to tank 18. Pressure is then built up against the underside of disc 34. It is essential that the first liquid have a boiling point that is slightly higher than the ambient temperature of the surroundings. Approximately 5° is a convenient temperature differential between the boiling point of the first liquid and the temperature of the surroundings. However, the differential should be no more than approximately 25°. Since trichloromonofluoromethane, known as Freon 11, has a boiling point of approximately 75° Fahrenheit, it has proven to be a very desirable test liquid for most environments.

Above valve disc 34 is a second liquid, such as water or Freon 11. Any leaks in the valve will result in visually observable bubbles in the second liquid. While water has proven to be satisfactory as the second liquid, it is even more desirable to use the same material for the second liquid as is used for the first liquid. This eliminates the possibility of the first liquid being contaminated by the second liquid. Therefore, when Freon 11 is used as the first liquid it is preferable to use it as the second liquid.

After the valve test is completed, valve 14 is closed and valve 42 is opened, thus allowing the first fluid to return to reservoir 8 via conduits 16 and 44. Where the second fluid is the same as the first fluid, valve 30 may be opened so that the second fluid can return to reservoir 8.

Figure 3:
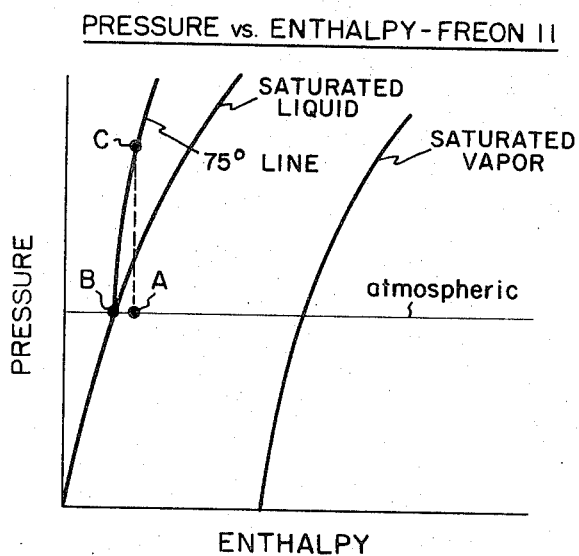
FIG. 3 is a plot of pressure versus enthalpy for Freon 11.

Referring to FIG. 3, a plot of pressure versus enthalpy for Freon 11, the operation of the present invention will become even more clear. Valve 30 is left partially open and the liquid Freon is allowed to flood the partially open valve. When the liquid Freon is above disc 34 but below the top surface 35 of the valve body, the valve is closed. At this time, the liquid is completely characterized by point B in FIG. 3. Note that its pressure is approximately atmospheric and its temperature is approximately 75° Fahrenheit. The region to the left of the saturated liquid line is all liquid. The region to the right is a mixture of Freon vapor and liquid. As the saturated vapor line is approached, the vapor becomes more predominate. At the saturated vapor line, the Freon 11 is 100% vapor.

Pressure is built up below disc 34 in valve 30 by means of external pump 10 to the required test pressure. A typical test would pressurize the Freon 11 to approximately 800 pounds per square inch. Thermodynamically, this process is one from point B to point C. If any leakage seeps past disc 34, it is a throttled or constant enthalpy process. This is shown as a dashed line from point C to point A. The vertical nature of the dashed line indicates that it is a constant heat process. It is well known to those skilled in the art that such throttling processes are constant heat processes.

Note that as the Freon 11 leaks past valve disc 34 it crosses the saturated liquid line. This indicates that it has gone from a liquid to a partial vapor. As the partial vapor enters the second liquid, small bubbles are visible to the human eye to indicate valve leakage. If the valve opens vertically, as shown in FIG. 1, bubbles are easier to detect.

The sensitivity of the test procedure of the present invention is at least as good as that of air or gas seeping by a valve disc and bubbling through water. However, by utilizing a liquid whose boiling point is approximately equal to the ambient temperature of the surroundings, the entire operation is inherently safe, since the high pressure conditions are in the liquid, rather than the gaseous, state.

While there has been described what is at present considered a preferred embodiment of the invention, it will be obvious to those skilled in the art that various changes and modifications may be made therein without departing from the invention, and it is, therefore, aimed in the appended claims to cover all such changes and modifications as followed in the true spirit and scope of the invention.

What is claimed is:

1. A method of testing a valve for leakage comprising:
   placing a first liquid whose boiling point is slightly higher than the ambient temperature of the surroundings on one side of the valve,
   placing a second liquid on the other side of the valve,
   increasing the pressure of said first liquid to a predetermined amount, and
   observing said second liquid for bubbles caused by leakage of said first liquid.

2. A method as defined in claim 1, wherein Freon 11 is the first liquid.

3. A method as defined in claim 2, wherein Freon 11 is the second liquid.

4. A method as defined in claim 1, wherein water is the second liquid.

5. A method as defined in claim 4, wherein Freon 11 is the first liquid.

6. An apparatus for testing valves for leakage comprising:
   a first liquid whose boiling point is slightly higher than the ambient temperature of the surroundings on one side of the valve,
   a second liquid on the other side of the valve, and
   means for increasing the pressure of said first liquid to a predetermined amount, whereby any leakage of said first liquid may be observed as bubbles in said second liquid.

7. An apparatus as defined in claim 6, wherein said first liquid and said second liquid are the same.

8. An apparatus as defined in claim 6, wherein said second liquid is Freon 11.

9. An apparatus as defined in claim 8, wherein said first liquid is Freon 11.

10. An apparatus as defined in claim 9, wherein the valve is a butterfly valve.

11. An apparatus as defined in claim 10, wherein said means for increasing the pressure of the first liquid comprises a pump.

12. An apparatus as defined in claim 6, wherein said first liquid is Freon 11.

13. An apparatus as defined in claim 6, wherein said second liquid is water.

14. An apparatus as defined in claim 13, wherein said first liquid is Freon 11.

15. An apparatus as defined in claim 14, wherein said means for increasing the pressure of the first liquid comprises a pump.

16. An apparatus as defined in claim 15, wherein said valve is a butterfly valve mounted in a horizontal position with said water being above said valve and said Freon 11 being below said valve.

17. An apparatus as defined in claim 10, wherein the butterfly valve is mounted in a horizontal position.

* * * * *